(No Model.)
J. A. CURRIE.
PROCESS OF MANUFACTURING HOMINY FLAKES OR CORN FLAKES.
No. 427,159. Patented May 6, 1890.
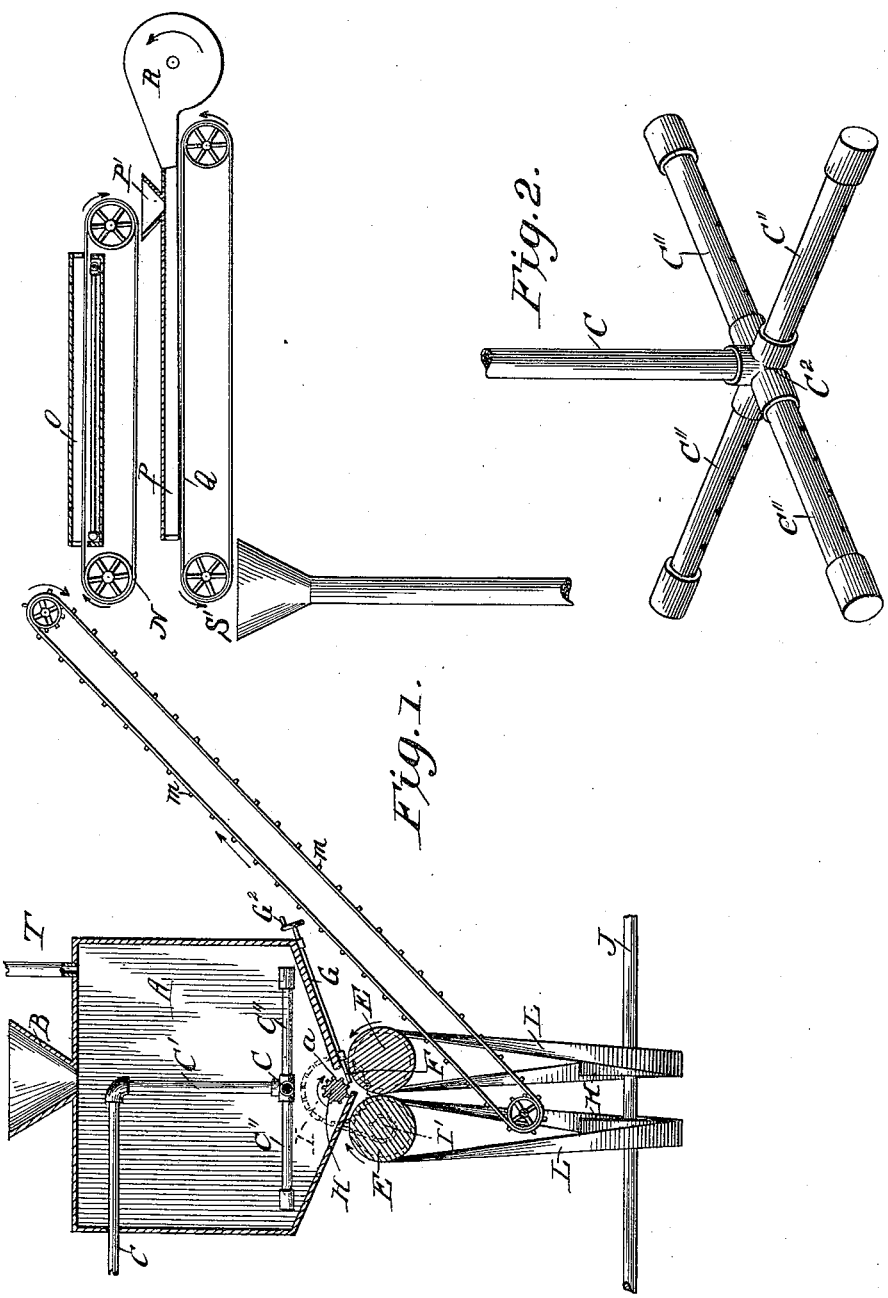
WITNESSES:
Fred G. Dieterich
Edw. W. Byrn
INVENTOR:
James A. Currie.
BY Munn
ATTORNEYS

UNITED STATES PATENT OFFICE.

JAMES A. CURRIE, OF SPRINGFIELD, OHIO.

PROCESS OF MANUFACTURING HOMINY-FLAKES OR CORN-FLAKES.

SPECIFICATION forming part of Letters Patent No. 427,159, dated May 6, 1890.

Application filed December 2, 1889. Serial No. 332,326. (No model.)

*To all whom it may concern:*

Be it known that I, JAMES A. CURRIE, a citizen of the United States, residing at Springfield, in the county of Clark and State of Ohio, have invented certain new and useful Improvements in Hominy or Corn Flakes, of which the following is a full, clear, and exact description.

My invention relates to the art or process of making a new edible product from Indian corn or maize, to which I have given the name of "hominy-flakes" from the fact that certain steps in my process of manufacture are somewhat similar to those used in the manufacture from Indian corn of a food product generally known as "hominy."

The object of my invention is to produce from Indian corn or maize a food product which can be cooked in much less time than hominy and yet preserve its flavor, form, and consistency.

Another object of my invention is to produce a new and palatable article of food from Indian corn or maize that will preserve its wholesome and palatable properties in any climate, not being liable to fermentation or souring by changes of temperature, to which most, if not all, the products which are now made from Indian corn in its raw state are liable.

To carry out my invention, I take dry corn and first subject it to the process of hulling and degerminating for removing all the exterior skin from the kernel and extracting the germ. I then place the hulled and degerminated corn in a suitable closed receptacle and subject it to the action of steam until it is cooked soft, but not enough to destroy the individuality of the grain, the time employed varying with the amount of corn in the receptacle and the temperature of the steam.

After the steaming process is complete I remove the corn from the steaming-receptacle and pass it while hot between a pair of equally-speeded cold rolls. These latter roll it into broad thick flakes. The action of the steam upon the corn is such as to cause the individual kernels or fractional kernels to preserve the coherence of their particles, while being subjected to the action of the rolls so as not to subdivide them into small fragments. The flakes can be rolled after the steamed mass of corn has become cool or partially cool; but if allowed to become cool before being passed through the rolls the product is not so good, as many of the flakes are broken and they are not as large and perfect as when they have been rolled hot from the steaming-receptacle.

In the accompanying drawings is illustrated the mechanism which I have adopted for performing the several steps of my process.

In said drawings, Figure 1 is a side view, partly in section, of the several mechanisms employed in cooking the previously hulled and degerminated corn, rolling the same into flakes and drying the cooked and rolled corn, and also shows means for feeding and conveying the corn from one part to another; and Fig. 2 is an enlarged detached view of the heating-pipes in the cooking-receptacle.

The letter A designates the receptacle in which the hulled and degerminated corn is cooked, said receptacle having at its top a hopper B, through which it is supplied with the corn. The bottom of the receptacle preferably inclines downwardly toward the center, as shown, and at said center is cut away to form the longitudinal opening $a$, through which the corn when cooked is fed between the rollers E by the means hereinafter described. This opening $a$ is kept normally closed by a slide F, which is secured to and worked backward and forward by a screw-threaded rod G, which passes through an internally-screw-threaded perforated support G', depending from the side of the receptacle A, and is provided at its outer end with a hand-wheel $G^2$, for convenience in operating it.

C C' C'' designate the pipes for the passage of steam. The pipe C is horizontal and is connected at its outer end with a suitable steam-generator (not shown) and at its inner end with the upper extremity of the vertical pipe C'; the lower extremity of which is connected by a five-way coupling $C^2$ with the four horizontal pipes C'', which radiate therefrom. These pipes C'' are located at the bottom of the receptacle are each formed with a series of perforations $c$, for the exit into the receptacle of the steam, and are closed at their outer ends by caps. Beneath these pipes C″ and contiguous to the opening $a$ in the receptacle A is a longitudinally-corrugated roller H, the office of which is to feed the cooked corn between the rollers E, which roll the same into flakes, said opening $a$ being previously uncovered to permit the corn to pass through it. This feed-roller H is rotated at a less speed than the rolls E by means of a large toothed wheel I, which is connected by an endless chain $I^2$ with a small open wheel I′, mounted on the shaft of one of the rolls E, and said rolls E are rotated from a main drive-shaft J, which is set at right angles to said rolls and carries pulleys K, connected with said rolls by the twisted belts L. The rolled corn falls onto a belt M, which is provided with a series of transverse upwardly-extending projections $m$, by which said corn is conveyed to another endless belt N, which conveys it through a steam-heated drying-chamber O, and said corn falls from said belt N (after it has passed through said drying-chamber O) through a hopper P′ onto another endless belt Q, which passes through a bottomless open-ended chamber P, in which it is further dried by an air-blast from a revolving fan located within a shoe R at the end of said chamber P. The product is now in condition for the market and falls from the belt N into a tube S, which has a funnel-shaped upper end S′ and is conducted by said tube to a suitable place to be packed for sale.

As above shown, the hulled and degerminated corn remains in the receptacle A until substantially cooked, which cooking is accomplished by the steam which permeates the corn, said steam, after passing through the corn, escaping from said receptacle through a pipe T at the top of the receptacle.

It has been found from practical experience that the resultant product of the above-described process can be prepared for the table in from ten to fifteen minutes, thus obviating the objection urged against hominy, which ordinarily requires six hours' cooking before it is in condition to be eaten, and also that it possesses all the pleasant taste and nutritive qualities of hominy and substantially the form and consistency of the same.

In defining my invention with greater clearness I would state that I am aware of the product known as "Cerealine," which, as made under the patent to Gent, No. 223,847, consists of corn cracked and hulled to form grits, which is then steamed till soft and tough and then passed between hot rolls to form very thin light and white attenuated scales, which, however, do not have the appearance or consistency of hominy.

In my invention the grains of hominy are cooked whole, and are gelatinized and rendered wholesome and capable of easy digestion before rolling, the subsequent mashing of the large grains by rolling serving only to flatten the grains to render them quickly soluble for easy preparation for the table. The physical properties which distinguish my finished product are the translucent appearance of the thick large flakes due to the conversion of the starch into the gelatinous consistency of dextrine in contradistinction to the mechanical rupture of starch-cells by a close adjustment of hot rolls without previous conversion of the starch. As it is well known that raw starch is almost indigestible and that starch when gelatinized to form dextrine is a wholesome and easily-digestible article of food, the distinctive merits of my invention may be easily understood.

Having thus described my invention, what I claim as new, and desire to secure by Letters Patent, is—

1. The process of preparing corn for food, which consists in first reducing it to hominy, then cooking the grains till they have been gelatinized or converted into dextrine, and then crushing the grains without destroying their individuality into large thick flattened flakes, substantially as shown and described.

2. The hominy-flake product herein described, consisting of whole grains of hominy gelatinized by steam and rolled into large thick translucent flakes, substantially as described.

In testimony whereof I affix my signature in presence of two witnesses.

JAMES A. CURRIE.

Witnesses:
FLETCHER WHITE,
JOHN GOODFELLOW.